(12) United States Patent
Fischer et al.

(10) Patent No.: US 6,648,781 B1
(45) Date of Patent: Nov. 18, 2003

(54) CONTINUOUSLY VARIABLE TRANSMISSION

(75) Inventors: Robert Fischer, Bühl (DE); Bernhard Walter, Oberkirch (DE); Christian Bauer, Bühl (DE); Oswald Friedmann, Lichtenau-Ulm (DE)

(73) Assignee: K Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/572,263

(22) Filed: May 17, 2000

(30) Foreign Application Priority Data

May 17, 1999 (DE) .......................................... 199 22 575

(51) Int. Cl.[7] .............................................. F16H 55/56
(52) U.S. Cl. .......................................... 474/8; 474/201
(58) Field of Search .................... 474/175, 176, 474/177, 178, 201, 242, 244, 245, 8, 18, 28

(56) References Cited

U.S. PATENT DOCUMENTS

| 3,494,212 A | * | 2/1970 | Thomson .................... 474/178 |
| 5,667,448 A | | 9/1997 | Friedmann |
| 5,711,730 A | | 1/1998 | Friedman et al. |
| 6,123,634 A | * | 9/2000 | Faust et al. ..................... 474/8 |

FOREIGN PATENT DOCUMENTS

| EP | 0462637 | * | 12/1991 | ................. 474/177 |
| JP | 55-36670 | * | 3/1980 | ................. 474/167 |

* cited by examiner

Primary Examiner—Thomas R. Hannon
Assistant Examiner—Vicky A. Johnson
(74) Attorney, Agent, or Firm—Darby & Darby

(57) ABSTRACT

An adjustable pulley for use in a continuously variable transmission has two coaxial flanges at least one of which is a composite flange having an annular main section with a conical surface adjacent a reinforcing liner of wear resistant material. The liner is secured to the main section of the composite flange by a one-piece or composite disc-shaped insert one side of which has several portions affixed (such as bonded and/or riveted) to the adjacent side of the liner, and the other side of which has several portions affixed to the conical surface and/or another part of the main section. Those portions of the one side of the insert which are affixed to the liner are out of register with those portions of the other side of the insert which are affixed to the main section to thus enable the liner to move relative to the conical surface in one or more directions other than circumferentially of the main section.

4 Claims, 12 Drawing Sheets

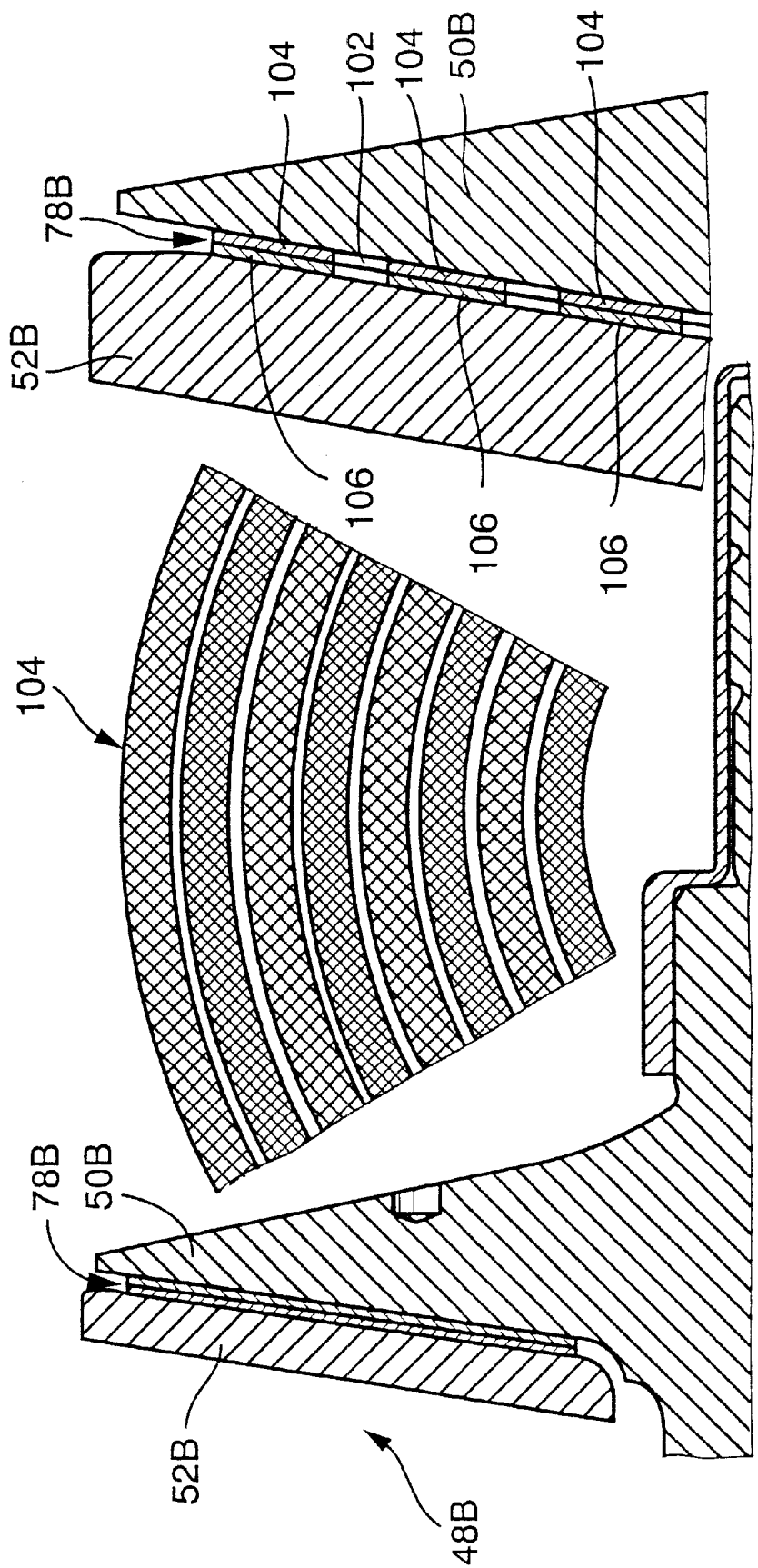

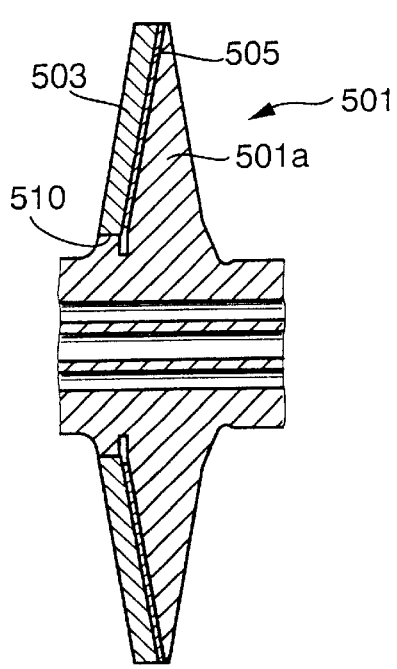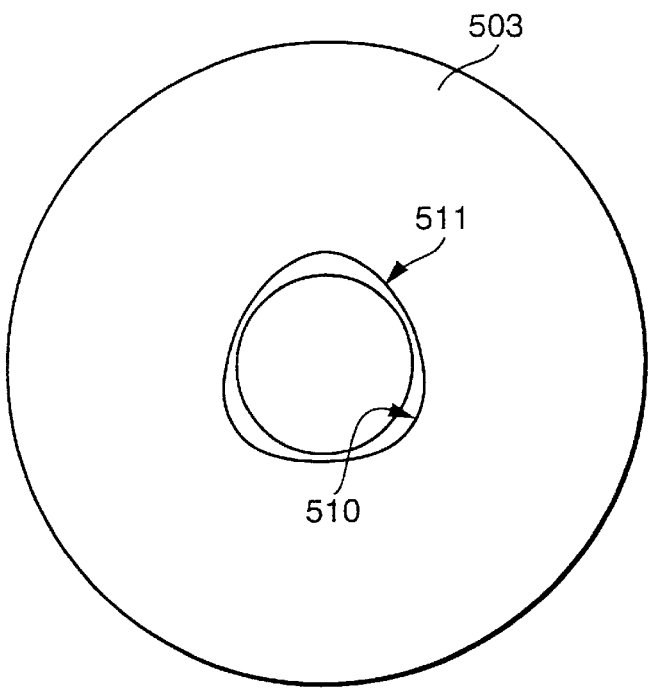
Fig. 20  Fig. 21
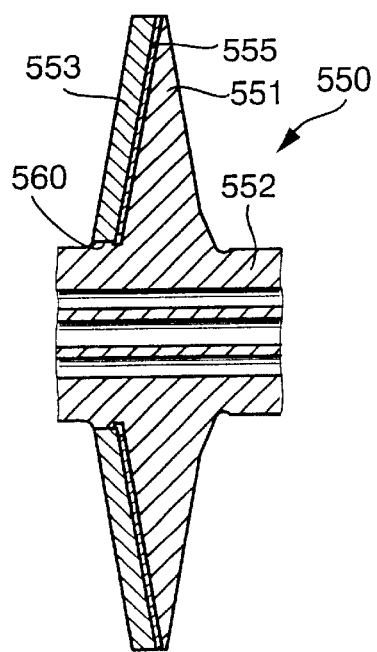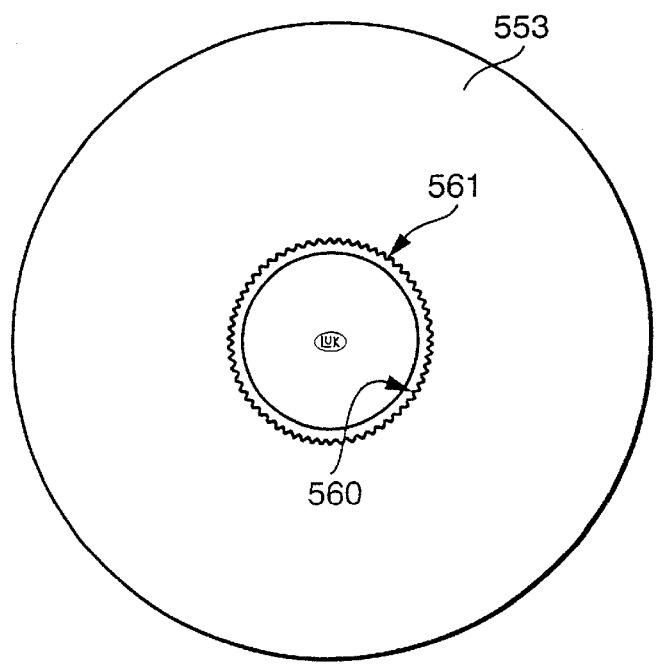
Fig. 22  Fig. 23

CONTINUOUSLY VARIABLE TRANSMISSION

BACKGROUND OF THE INVENTION

The invention relates to transmissions in general, and more particularly to transmissions which employ pulleys or sheaves. Still more particularly, the invention relates to improvements in pulleys of the type wherein two coaxial flanges have confronting surfaces engageable with a portion of an endless flexible element (such as a belt or a chain) which transmits torque to or receives torque from the pulley. Pulleys of the type to which the present invention pertains can be utilized with particular advantage in transmissions of the type known as CVT (continuously variable transmissions), e.g., in the power trains of motor vehicles to directly or indirectly transmit torque between a prime mover (such as an internal combustion engine) and the wheels of the motor vehicle. Reference may be had, for example, to commonly owned U.S. Pat. No. 5,667,448 (granted Sep. 16, 1997 to Oswald FRIEDMANN for "POWER TRAIN"), to commonly owned U.S. Pat. No. 5,711,730 (granted Jan. 27, 1998 to Oswald FRIEDMANN and Armin VEIL for "TORQUE MONITORING APPARATUS") and/or to published German patent application Serial No. 197 48 675 A1.

The just mentioned published German patent application Serial No. 197 48 675 A1 discloses two adjustable pulleys each having an axially fixed flange and an axially movable flange. The flanges have main sections provided with confronting conical surfaces, and conical liners which are bonded or otherwise affixed to the conical surfaces and are made of a wear-resistant material.

Published German patent application Serial No. 691 00 344 T2 discloses pulleys wherein the annular main sections of the flanges carry liners made of steel and being secured to the conical surfaces of the respective main sections by layers of adhesive made of polyurethane which is intended to absorb noise as well as to contribute to lower cost of the pulleys.

The disclosure of the commonly owned German priority patent application Serial No. 199 22 575.3 (filed May 17, 1999) and the disclosures of all U.S. and/or foreign patents and patent applications identified in the specification of the present application are incorporated herein by reference.

The aforementioned composite flanges exhibit the drawback that the direct connections between the liners and the annular main sections of the respective flanges are unreliable and can stand only relatively short periods of actual use. Furthermore, the material of the presently known and employed liners is also incapable of standing extensive periods of use, particularly in the aforementioned CVT transmissions. Thus, there exists an urgent need for high-quality pulleys or sheaves wherein the liners of composite flanges as well as the connections between such liners and the main sections of the respective flanges are superior to those employed in presently known pulleys.

OBJECTS OF THE INVENTION

An object of the instant invention is to provide a pulley wherein the liners are connected to the annular main sections of the flanges in a novel and improved way.

Another object of the invention is to provide novel and improved liners for use in the flanges of the above outlined pulleys.

A further object of the invention is to provide novel and improved means for centering the liners on the main sections of the respective flanges in a pulley, particularly in a pulley which is to be utilized in a continously variable transmission.

An additional object of the invention is to provide novel and improved connectors which can secure the liners to the main sections of the respective flanges and remain operative during the entire useful life of the flanges.

Still another object of the invention is to provide connectors which exhibit superior sound-absorbing or sound-deadening characteristics.

A further object of the invention is to provide a transmission which employs pulleys exhibiting the above enumerated desirable characteristics.

Another object of the invention is to provide a novel and improved method of making pulleys exhibiting the above-outlined desirable characteristics.

An additional object of the invention is to provide a novel and improved method of assembling the constituents of the above outlined pulleys.

Still another object of the invention is to provide pulleys having a useful life greatly exceeding those of the aforediscussed and other conventional pulleys.

A further object of the invention is to provide pulleys which can be mass-produced at a reasonable cost, which exhibit highly satisfactory acoustic characteristics (sound absorbency), and the useful life of which is surprisingly long even if such pulleys are utilized under circumstances wherein they are exposed to temperatures which fluctuate within a wide range and to highly pronouced mechanical (such as frictional, torsional and other) stresses.

SUMMARY OF THE INVENTION

One feature of the present invention resides in the provision of a pulley comprising a composite rotary flange including an annular section rotatable about a predetermined axis and having an annular surface (normally a conical surface) extending at least substantially radially of the predetermined axis, a wear-resistant liner adjacent the annular surface, an insert (particularly a substantially disc-shaped insert) between the liner and the annular surface, and means for connecting the insert to the annular section and to the liner. The connecting means comprises a first unit having means for affixing or securing the insert to the annular section and a second unit having means for affixing or securing the insert to the liner. The securing means of the first unit is offset relative to the securing means of the second unit as seen in at least one of a plurality of directions including axially and radially of the flange.

A first side of the liner confronts the insert, and a second side or surface of the liner is arranged to be engaged by an endless flexible element (e.g., a belt, a band or a chain) of a continuously variable transmission, e.g., a transmission in the power train of a motor vehicle.

In accordance with one presently preferred embodiment of the invention, the insert includes a disc-shaped annular metallic member, and the securing means of at least one of the connecting units includes rivets which secure the metallic member to the annular section or to the liner. To this end, the disc-shaped insert can be provided (e.g., in an upsetting or an equivalent machine) with holes bounded by collars extending in substantial parallelism with the predetermined axis, and the collars can form part of at least one of the connecting units. The collars can include (a) a first set of collars extending away from the liner and forming part of the first connecting unit, and (b) a second set of collars extending away from the annular section and forming part of the second connecting unit. If the securing means of the two units include rivets, the annular surface can be provided with first recesses for the rivets of the first unit, and that side of the liner which confronts the insert can be provided with recesses for the rivets of the second unit. The rivets can include deformed malleable bodies of a suitable metallic material, and such rivets are received in the collars and are anchored in the respective recesses. The malleable bodies are or can be deformed as a result of the application of axial forces to the liner and/or upon the annular section in the direction(s) toward the insert. The rivets are preferably configured in such a way that each collar fills a first portion and each of the deformed bodies fills the remaining portion of the respective recess.

The first unit of the connecting means can be located at or nearer to the radially outer portion of the annular surface, and the second unit of the connecting means can be located at or nearer to the radially inner portion of the annular surface, or vice versa. The securing means of at least one unit can include rivets, and the insert can be provided with slots (e.g., with arcuate slots extending circumferentially of the annular section) which are disposed between the inner and outer portions of the annular surface.

In accordance with another presently preferred embodiment, the insert includes or constitutes a disc-shaped annular member having a central portion and a peripheral portion located radially outwardly of the central portion. The peripheral portion is provided with pluralities of alternating first and second flexible tongues respectively extending clockwise and counterclockwise (as seen circumferentially of the annular surface), the securing means of the first unit includes means for affixing the first tongues to the annular section, and the securing means of the second unit includes means for affixing the second tongues to the liner. At least one of the first and second units of the connecting means can comprise rivets, and the tongues can be configured and made in such a way that each thereof has a first end portion which is of one piece with the central portion of the insert and a free second end portion which is spaced apart from the respective first portion (as seen circumferentially of the annular surface). The rivets of the first unit serve to affix the second end portion of each first tongue to the annular section, and the rivets of the second unit serve to affix the second end portions of the second tongues to the liner.

When properly installed, the insert can be stressed to pull the liner axially of and toward the annular section.

The securing means of at least one unit of the connecting means can include means for bonding the insert to the annular section or to the liner. The just mentioned insert can constitute a laminate including two outer layers and a central layer which is sandwiched between the outer layers. At least one layer of the laminate (e.g., the two outer layers) can contain or consist of a sound absorbent material. One of the outer layers can be bonded to the liner and to the central layer, and the other outer layer can be bonded to the annular surface of the annular section and to the central layer. The latter can be provided with slits which divide it into first and second panels or fields respectively bonded to the one and the other outer layer. The central layer of the laminate can constitute an annular disc, and the fields of such disc can be configured and distributed in such a way that the layers can move relative to each other radially of the predetermined axis and in the axial direction but not in the circumferential direction of the annular surface of the annular section of the flange.

It is also possible to employ a central layer which comprises several first and second at least substantially concentric rings which alternate as seen radially of the predetermined axis; the first rings can be bonded to one of the outer layers of the laminate and the second rings are bonded to the other outer layer of such laminate. At least some of the rings can be made of or can contain a fibrous material.

The insert can comprise or constitute a washer having a first side partially bonded to the annular surface of the annular section and a second side partially bonded to the liner.

The flange can further comprise means for non-rotatably centering the liner and/or the insert on the annular section of the flange. The centering means can comprise external teeth on the annular section and internal teeth mating with the external teeth and provided on the liner or on the insert. Alternatively, the centering means can comprise an external shoulder at the surface of the annular section and a complementary internal surface provided in the liner and/or in the insert and non-rotatably surrounding the shoulder. Still further, the centering means can comprise a peripheral surface provided on the annular section and an annular extension provided on the liner and/or on the insert and snugly surrounding the peripheral surface. The peripheral surface can be provided with external teeth, and the extension(s) can be provided with internal teth in mesh with the external teeth.

At least one side of the insert can be provided with a coat which exhibits one or more desirable characteristics such as pronounced resistance to wear, pronounced hardness, acting as a solid or liquid lubricant and enhancement of smoothness of such side of the insert.

At least one side of the insert can be provided with one or more lubricant-receiving and distributing channels.

Highly satisfactory results were obtained with inserts made, at least in part, of high-quality sheet steel or bronze.

The annular section of the flange but particularly the liner can consist of a metallic material which has undergone at least one of the treatments including case hardening, tempering and induction hardening. Highly satisfactory results were obtained with a flange employing a liner consisting of a case hardened metallic material.

Another feature of the present invention resides in the provision of a method of making a pulley of the type having flanges at least one of which includes (a) an annular section rotatable about a predetermined axis and having a preferably conical annular surface, and (b) a liner which is adjacent the annular surface and is engageable by an endless flexible element (such as a band, belt or chain) for transmission of torque to and from the pulley. The method comprises the steps of placing an annular disc-shaped (composite or one-piece) insert between the annular surface of the annular section and the liner, connecting first portions of the insert to the annular section, and connecting different second portions of the insert to the liner.

The method can further comprise the step of centering the liner and/or the insert on the annular section.

At least one of the connecting steps can include bonding the liner or the annular section to the respective portions of the insert. Alternatively, or in addition to bonding, at least one of the connecting steps can include riveting the liner or the annular section to the respective portions of the insert. For example, the connecting steps can include providing the insert with first and second sets of flexible tongues, affixing (e.g., riveting) the tongues of one of the sets to the annular section, and affixing (e.g., riveting) the tongues of the other set to the liner.

The novel features which are considered as characteristic of the invention are set forth in particular in the appended claims. The improved pulley itself, however, both as to its construction and the modes of assembling and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 11 is a fragmentary axial sectional view of a flange which constitutes a modification of the flange shown in FIG. 9;

FIG. 12 is a fragmentary front elevational view of the central layer of the insert forming part of the flange shown in FIG. 11;

FIG. 13 is an enlarged view of a detail of the structure shown in FIG. 11;

FIG. 20 is a fragmentary axial sectional view of a flange wherein the liner and the insert are centered on the annular section of the flange in one of several novel ways;

FIG. 21 is a fragmentary front elevational view of the insert and annular section of the flange shown in FIG. 20;

FIG. 22 is a fragmentary axial sectional view similar to that of FIG. 20 but showing a different mode of centering the liner and the insert on the annular section of the flange; and FIG. 23 is a fragmentary front elevational view of the insert and annular section of the flange shown in FIG. 22.

DESCRIPTION OF PREFERRED EMBODIMENTS

Figure 1:
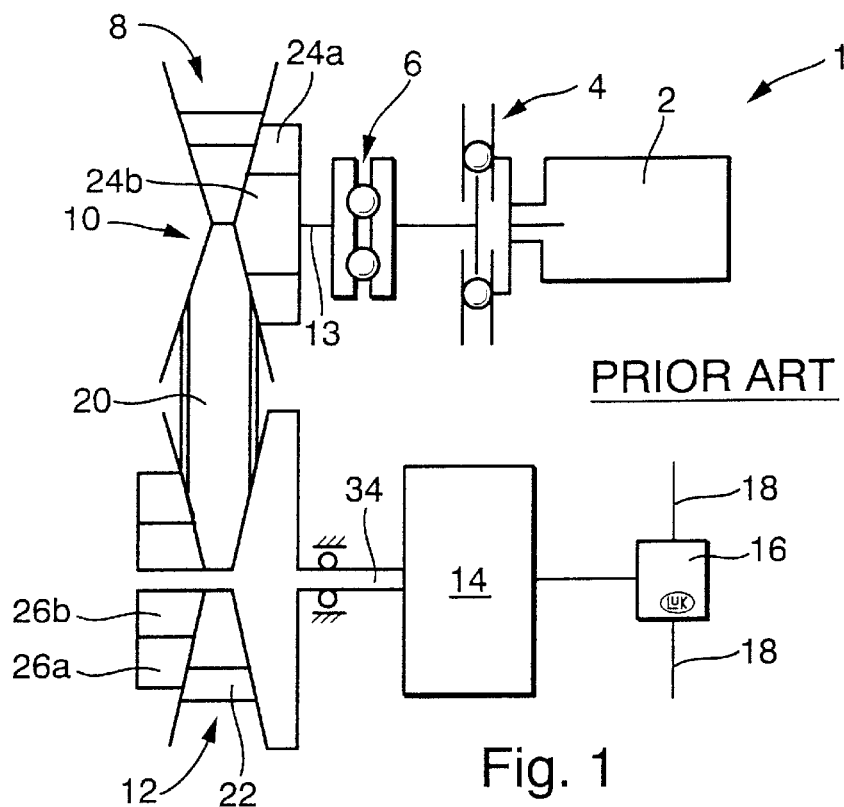
FIG. 1 is a schematic elevational view of the power train which is installed in a motor vehicle and comprises a continuously variable transmission employing two adjustable pulleys having flanges of conventional design, namely of the type disclosed in the aforementioned German patent application Serial No. 197 48 675 A1.

FIG. 1 shows certain details of a power train 1 which is of the type shown and described in the aforementioned published German patent application Serial No. 197 48 675 A1 and can be utilized in a motor vehicle to transmit torque between a prime mover 2 (such as an internal combustion engine, an electric motor or a hybrid prime mover) and the wheels (not shown) of the vehicle. The rotary output element (e.g., a crankshaft or a camshaft) of the prime mover 2 can transmit torque to a torsional vibration damper 4 which, in turn, can transmit torque to a torque sensor 6. The components 4, 6 can be of the type described, for example, in the aforementioned U.S. Pat. No. 5,711,730 to Friedmann et al. The torque sensor 6 is mounted on the input shaft 13 of a continuously variable transmission (CVT) 10, the output shaft 34 (see also FIG. 2) of which can transmit torque to a torque transmitting unit 14 normally comprising a starter element (such as a clutch or a converter) and a device which serves to change the direction of movement of the vehicle from forward to reverse or vice versa. The output of the unit 14 transmits torque to or receives torque from a differential 16 which is connected with the axles 18 for the front or rear wheels of the motor vehicle.

The transmission 10 comprises a first adjustable pulley 8 and a second adjustable pulley 12 having two coaxial conical flanges 30, 32 (see FIG. 2) mounted on the output shaft 34. The flange 30 is affixed to the shaft 34 so that it cannot move axially and/or circumferentially of such shaft; however, the flange 32 is movable axially of the shaft 34 toward or away from the fixed flange. The internal teeth 36 of the flange 32 cooperate with axially parallel peripheral splines of the shaft 34 to hold the flange 32 against rotation relative to the parts 30, 34 but to enable the flange 32 to move axialy toward and away from the flange 30.

The transmission 10 further comprises an endless flexible element 20 (e.g., a belt or a chain, such as a link chain which is trained over the pulleys 8 and 12 so that it can transmit torque between the input shaft 13 and the output shaft 34 when the prime mover 2 is on and/or the vehicle is coasting). The element 20 is assumed to constitute a chain having links 22 which engage the adjacent conical surfaces of the flanges 30, 32 of the pulley 12 and the conical surfaces of the corresponding flanges forming part of the pulley 8. To this end, the end faces of the links 22 have inclinations complementary to those of exposed conical surfaces on the liners 40 of the flanges 30, 32 of the pulley 12 as well as to those of liners forming part of the flanges of the pulley 8.

The ratio of the transmission 10 is changed by shifting the axialy movable flange 32 of the pulley 12 toward the axially fixed flange 30 while simultaneously shifting the axially movable flange of the pulley 8 away from the axially fixed flange of the pulley 8, or vice versa. The means for changing the ratio of the transmission 10 comprises a pair of fluid-operated (preferably hydraulic) cylinder-and-piston assemblies 24a, 24b for the axially movable flange of the pulley 8, and a pair of cylinder-and-piston assemblies 26a, 26b for the axially shiftable flange 32 of the pulley 12. The ratio can be changed automatically, particularly at least substantially in dependency upon the magnitude of the torque which is being (or which is to be) transmitted between the pulleys 8 and 12, i.e., between the prime mover 2 and the unit 14. One of the assemblies 24a, 24b and 26a, 26b can be utilized to select the pressure between the end faces of the links 22 and the adjacent exposed conical surfaces of the flanges forming part of the pulleys 8, 12, and the other of these assemblies serves to actually change the transmission ratio, i.e., to shift the axially movable flange of the respective pulley toward or away from the associated axially fixed flange.

The exact details of the power train 1 of FIG. 1, and of numerous known modifications thereof, form no part of the present invention.

Figure 2:
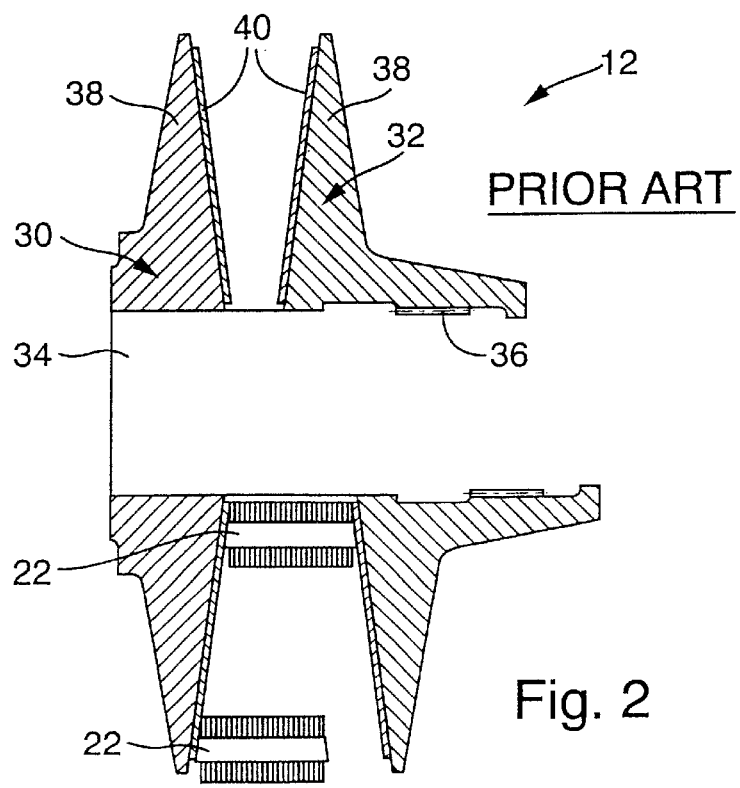
FIG. 2 is an enlarged axial sectional view of one of the two pulleys in the transmission of FIG. 1.

FIG. 2 shows that the flange 30 is a separately produced part which is fixedly secured to the output shaft 34. However, it is equally possible to make the flange 30 of one piece with the shaft 34.

The links 22 of that portion of the chain 20 which is trained over the pulley 12 are close to the periphery of the shaft 34 when the pulley 8 is to drive the pulley 12 at a maximum speed; at such time, that portion of the chain 20 which is trained over the pulley 8 is remote from the input shaft 13. In other words, the movable flange 32 is maintained at a maximum axial distance from the axially fixed flange 30 of the pulley 12, and the axially movable flange of the pulley 8 is held at a minimum axial distance from the axially fixed flange of the pulley 8 (see the link 22 in the lower part of FIG. 2).

If the transmission 10 is to act as a step-down transmission, the flange 32 is moved toward the flange 30 and the axially movable flange is moved away from the axially fixed flange of the pulley 8 (see the position 22' of the link shown in the lower part of FIG. 2).

The confronting conical surfaces of the flanges of pulleys in a continuously variable transmission are subject to extensive wear (due to frictional engagement with the end faces of the links (22) forming part of an endless torque transmitting element in the form of a chain, such as the chain 20 of FIG. 1). Therefore, it is customary (i.e., known) to provide the flanges of the pulleys with liners made of a wear-resistant material which come into direct contact with the links 22. FIG. 2 shows that the confronting conical surfaces of the annular main sections 38 of the flanges 30, 32 are shielded from direct contact with the links 22 by annular conically shaped liners 40. Thus, each of the two flanges 30, 32 is actually a composite flange including an annular main section 38 and a liner 40.

As long as they remain intact or have not yet undergone excessive wear, the liners 40 protect the respective annular main sections 38 from any wear and such liners can also ensure that the configurations (slopes) of the conical surfaces of the main sections 38 remain unchanged; this is important for predictable operation of the transmission 10. The material of the liners 40 is selected with a view to ensure that such liners can resist pronounced pressures (by the links 22) upon their exposed conical surfaces when the transmission 10 is in use.

German patent application Serial No. 197 48 675 A1 proposes to make the main sections 38 of a relatively inexpensive material but to employ a highly wear- and deformation-resistant material for the liners 40. For example, the main sections 38 can constitute castings and the liners 40 can be made of sheet steel. The German patent application proposes to connect the liners 40 to the respective annular main sections 38 in a number of different ways. Thus, such connections can constitute form-locking connections wherein projections of the liners 40 extend into complementary recesses of the adjacent sections 38 or vice versa. Furthermore, the liners 40 are bonded to the adjacent sections 38 (e.g., by utilizing an adhesive). The aforementioned projections can constitute tongues provided on the liners 40 and extending into complementary shallow recesses in the adjacent surfaces of the respective main sections 38.

German patent application Serial No. 197 48 675 A1 further proposes to place inserts between the concave sides of the liners 40 and the adjacent conical surfaces of the respective main sections 38. Such inserts constitute layers or films of adhesive which bonds the parts 38, 40 of the flanges 30, 32 to each other, or washers consisting of an elastomeric material and serving to prevent or reduce the transmission of noise between the liners 40 and the adjacent main sections 38. Still further, the German patent application proposes to provide, between the liners 40 and the adjacent annular sections 38, films of a hydraulic fluid (preferably the fluid which is utilized in the transmission 10 for other purposes such as lubrication and/or operation of the cylinder-and-piston assemblies 24a, 24b and 26a, 26b) The aforedescribed undertakings (to provide solid and/or liquid inserts between the liners 40 and the respective annular main sections 38) are intended to reduce the transmission of noise and to reduce the cost of the sections 38. The generation of noise is attributed primarily to abrupt impact of the links 22 upon the exposed sides of the liners 40.

As already mentioned hereinbefore, the aforediscussed undertakings proposed in the German patent application Serial No. 197 48 675 A1 do not suffice to ensure that the generation of noise will be reduced to an acceptable or tolerable level, that the cost of the pulleys will be acceptable for mass production, that the liners will stand the applied stresses and wear for extended periods of use, and/or that the connections between the liners and the main sections will remain intact during the entire useful life of the transmission, i.e., that it will not be necessary to remove the transmission from the power train for the purpose of inspecting and, if necessary, replacing the pulleys owing to excessive wear upon their flanges.

Figures 3, 4:
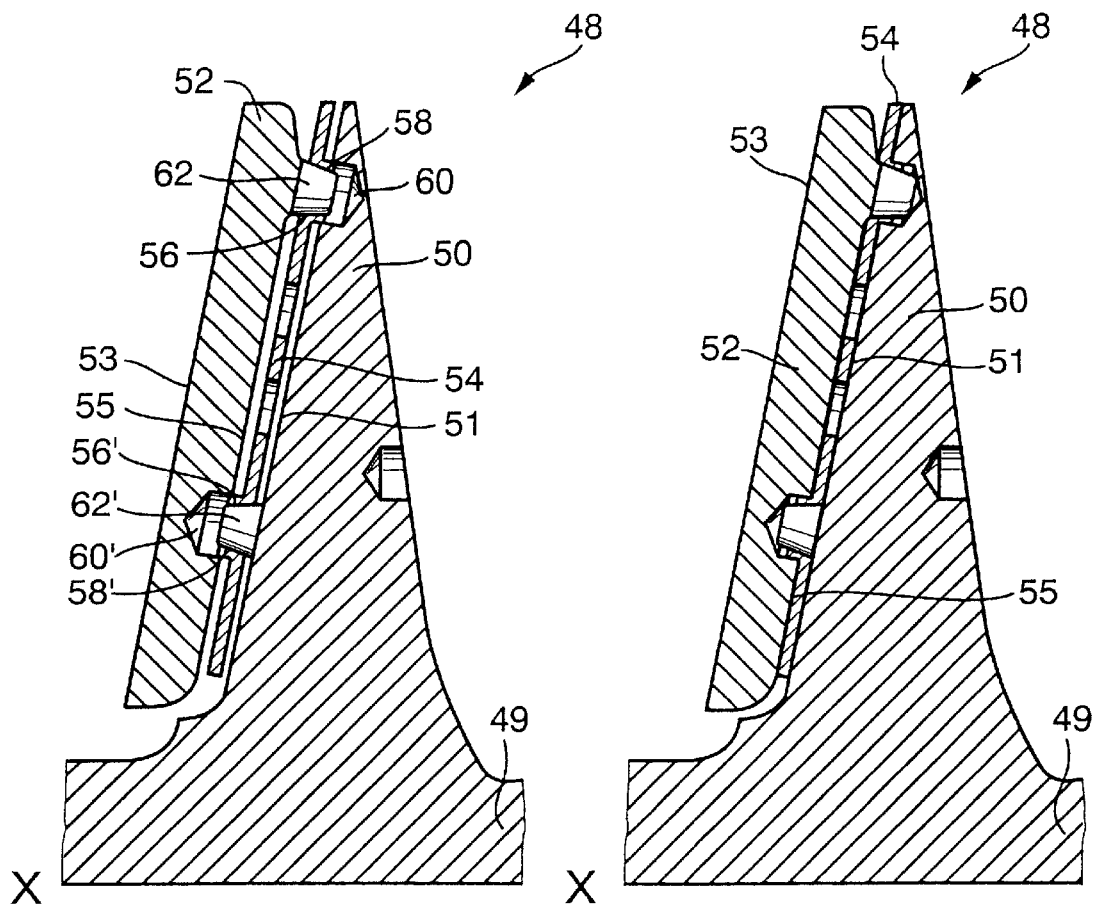
FIG. 3 is a fragmentary axial sectional view of a partially assembled composite flange forming part of a pulley which embodies one form of the present invention.
FIG. 4 shows the structure of FIG. 3 but with the flange fully assembled, the annular insert being riveted to the annular section and to the liner of the flange.

FIGS. 3 and 4 illustrate a flange 48 forming part of an adjustable pulley which is constructed and assembled in accordance with a first embodiment of the present invention. The flange 48 is an axially fixed flange and is of one piece with the input or output shaft 49 of the pulley. The other flange of such pulley is or can be identical with the illustrated flange 48 except that it is a mirror image of the flange 48 and is movable (within limits) axially of (but cannot rotate relative to) the shaft 49.

The flange 48 comprises an annular main section 50 which is of one piece with the adjacent portion of the shaft 49 and has a substantially radially extending conical annular surface 51 confronting the adjacent side 55 of a washer-like annular liner 52. The exposed other side 53 of the liner 52 is engaged by the links 22 of the chain 20 if the flange 48 replaces the flange 30 of the pulley 12 shown in FIGS. 1 and 2 (or the axially fixed flange of the pulley 8). The exposed side 53 of the liner 52 can be convex, concave or its section in a plane including the axis X of the shaft 49 can constitute a straight line. As a rule, the liner 52 is made of a metallic sheet material, e.g., of high-quality hardened wear-resistant sheet steel.

In accordance with an important feature of the invention, the flange 48 further comprises a separately produced insert 54 and composite means for connecting the insert to the main section 50 and for connecting the insert to the liner 52. The unit which secures or affixes the insert 54 to the section 50 includes an annulus of rivets 62 adjacent the radially outermost (peripheral) portion of the surface 51, and the unit which secures or affixes the insert to the liner 52 includes an annulus of rivets 62' adjacent the radially innermost portion of the surface 51. In other words, the constituents of the unit connecting the parts 50, 54 to each other are spaced apart from (i.e., out of register with) the constituents of the unit connecting the parts 52, 54 to each other (as seen in the radial, axial and circumferential directions of the flange 48). This contributes to the ability of portions of the insert 54 to move relative to each other, especially if the median portion of the insert (namely the portion between the annuli of rivets 62, 62') is provided with preferably arcuate slots 64 (see FIG. 5) extending in the circumferential direction of the coaxial parts 50, 52 and 54. The slots 64 can form two or more concentric annuli having their centers on the axis X when the flange 48 is fully assembled (see FIG. 4).

The insert 54 of the flange 48 is made of a metallic sheet material, e.g., in a machine which cuts a blank (FIG. 6) out of a sheet of metallic material and simultaneously provides the thus obtained blank with the aforediscussed slots 64 as well as with other configurations such as holes 56, 56' for the blind rivets 62, 62' as well as tubular collars 58, 58' for the respective rivets 62, 62'. The collars 58, 58' are or can be made simultaneously with the respective holes 56, 56' by displacing the corresponding portions of flat sheet metal stock during the making of the blanks which are thereupon converted into inserts 54 of the type shown in FIGS. 4 and 7. The collars 58 extend into corresponding complementary recesses 60 in the surface 51 of the main section 50, and the collars 58' extend into complementary recesses 60' in the adjacent side 55 of the liner 52.

Figure 7:
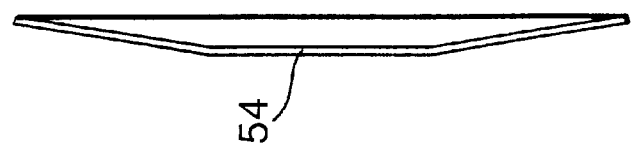
FIG. 7 is a side elevational view of the deformed insert.

The blind rivets 62, 62' are converted malleable frustoconical pins (FIG. 3) of a suitable metallic material which is deformed in response to the application of adequate axial forces to urge the liner 52 toward the surface 51 of the main section 50 and/or vice versa. This simultaneously entails a conversion of the the flat blank (shown in FIG. 6) into a finished insert 54 (FIGS. 4 and 7). A finished unit which affixes the insert 54 to the annular section 50 comprises an annulus of connections each including a collar 58 which fills a first portion of the respective recess 60 and a deformed pin 62 (blind rivet) which fills the remaining portion of the recess 60. Analogously, a finished unit which affixes the insert 54 to the liner 52 comprises an annulus of connections each including a collar 58' partially filling the respective recess 60' and a deformed pin 62' (blind rivet) filling the remaining portion of such recess 60'.

Forcible introduction of pins 60, 60' into the respective collars 58, 58' results in radial expansion of such collars and simultaneous deformation of the pins into blind rivets. Each of the pins 62 is inserted in such a way that its largerdiameter face abuts the side 55 of the liner 52, and each of the pins 62' is inserted in an orientation such that its larger-diameter end face abuts the surface 51 of the annular main section 50. The elastic deformability of the blank (undeformed insert 54 shown in FIG. 6) is such that its actual (permanent) deformation begins when the malleable pins 62, 62' begin to undergo deformation. Furthermore, the dimensions of the pins 62, 62' prior to deformation, as well as the dimensions of the holes 56, 56', collars 58, 58' and recesses 60, 60' are preferably selected in such a way that the deformed pins (finished blind rivets) cooperate with the adjoining parts (collars) and surfaces bounding the recesses to enable the rivets to withstand large forces tending to cause the deformed insert 54 to slide along the surface 51 of the annular section 50 and/or along the side 55 of the liner 52.

Figure 5:
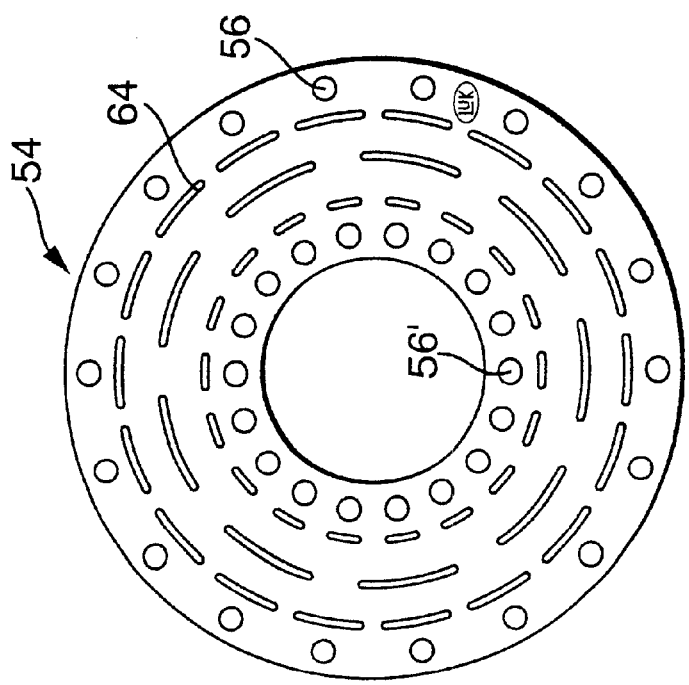
FIG. 5 is a front elevational view of the insert in the flange of FIGS. 3 and 4.

FIG. 5 shows that the holes 56 and 56' are respectively equidistant from each other, as seen in the circumferential direction of the blank which is to be converted into an insert 54 of the type shown in FIGS. 3, 4 and 7. The slots 64 enhance the flexibility of the blank radially of its axis as well as at right angles to the plane of FIG. 7, i.e., in the axial direction of the assembled flange 48.

Figure 6:
FIG. 6 is a side elevational view of the insert in undeformed condition.

Deformation of a blank from the configuration shown in FIG. 6 into a finished hollow conical annular insert 54 of the type shown in FIG. 7 takes place during assembly of the flange 48; however, it is also possible to effect such deformation or at least partial deformation of the blank prior to insertion between the annular section 50 and the liner 52.

Figure 8:
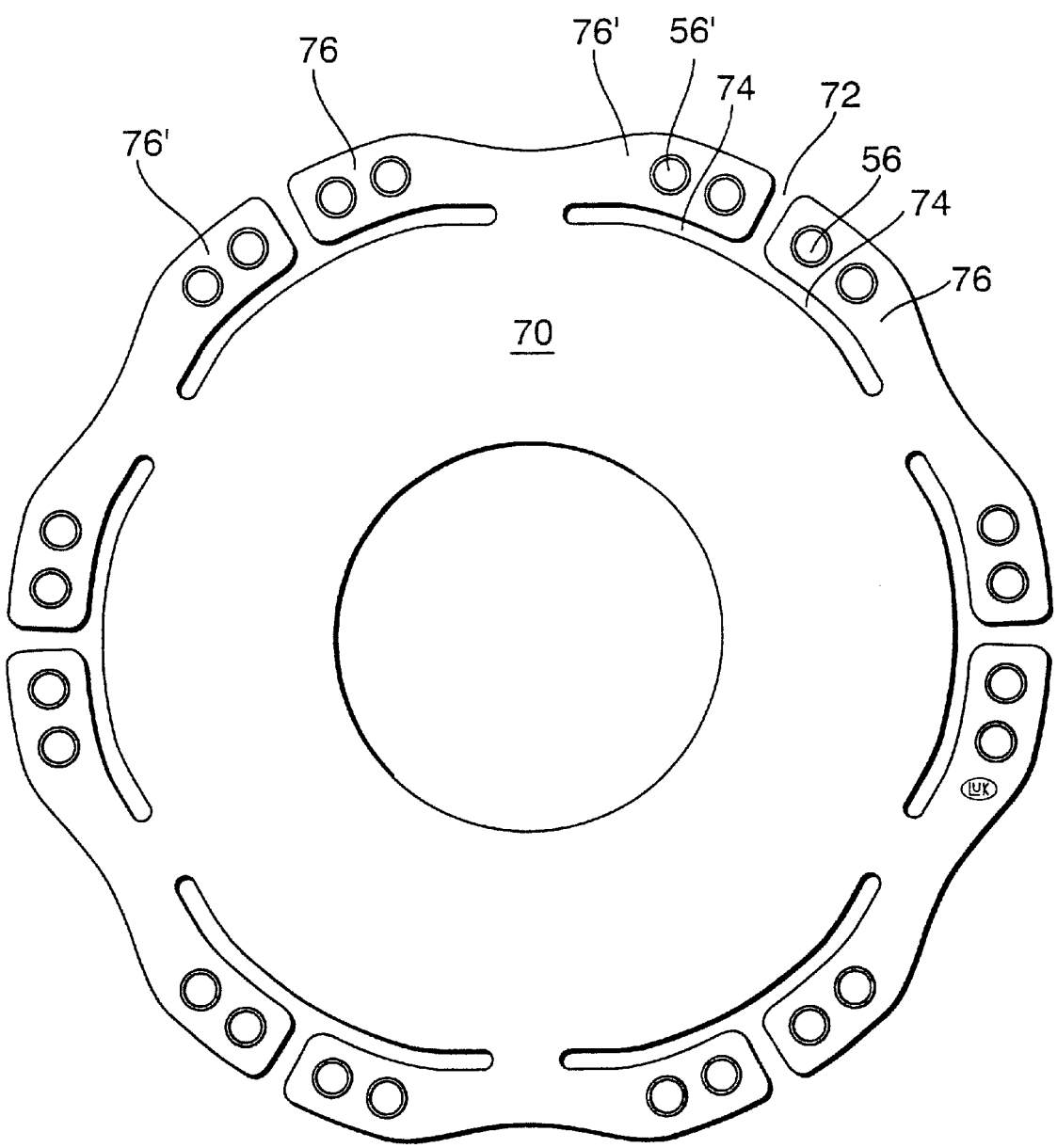
FIG. 8 is a front elevational view of a modified insert.

FIG. 8 shows a modified insert 70 wherein the means for connecting it to a modified annular section and to an annular liner is disposed at the periphery of the major or central portion of the insert. The first unit of the connecting means comprises an annular array or set of flexible elastic tongues or prongs 76, and the second unit comprises an annular array or set of flexible elastic prongs or tongues 76' which alternate with the tongues 76 as seen in the circumferential direction of the insert. Each of the tongues 76 has a first end portion of one piece with the annular central or main portion of the insert 70, and a free second end portion remote from the first end portion and provided with a pair of holes 56 for deformable pins (not shown) corresponding to the pins 62 of FIG. 3. Analogously, each tongue 76' has a first end portion of one piece with the annular main or central portion of the insert 76 and a free second end portion remote from the respective first end portion and provided with a pair of holes 56' for deformable pins corresponding to the pins 62' of FIG. 3. The free end portion of each tongue 76 is adjacent the free end portion of a tongue 76'. The neighboring free end portions of the tongues 76, 76' are separated from each other by radially inwardly extending slits 72. having open radially outer ends, and the major parts of the tongues 76, 76' are separated from the major or central portion of the insert 70 by circumferentially extending slits 74 each of which communicates with one of the radial slits 72.

The dimensions of the tongues 76 shown in FIG. 8 match those of the tongues 76'. The holes 56 are surrounded by collars extending at right angles to the plane of FIG. 8 toward the observer, and the openings 56' are surrounded by collars extending away from the observer of FIG. 8 (or vice versa). The purposes of such collars are the same as those of the collars 58, 58' shown in FIGS. 3 and 4. When the tongues 76, 76' are respectively riveted to the annular main section and to the liner of a flange, the main or central portion of the thus installed insert 70 has adequate freedom of movement radially and axially but not circumferentially of the annular main section.

The numbers of the tongues 76 and 76' can vary within a wide range without departing from the spirit of the present invention. Furthermore, the free end portion of each tongue can be provided with a single hole 56 or 56', or with more than two holes. Still further, the mode of riveting can depart from the aforedescribed mode with reference to FIG. 3. For example, the riveting can take place in several stages including a first stage of attaching the pins 62, 62' to a sheet metal blank which is to be converted into the insert 54 or 70, and a further stage including attachment of the blank to the liner and to the main section of the flange.

The rivets (converted pins 62, 62') and the collars 58, 58' can further serve as a means for centering the insert 54 or 70 on the annular main section (50) of a flange (48) and/or as a means for centering the liner (52) relative to the insert (54 or 70) and/or relative to the main section (50). The exposed side 53 of the liner 52 and/or the exposed side of the liner cooperating with the insert 70 can undergo a final treatment (such as smoothing, elimination of tolerance-caused departures from optimal positions relative to the respective annular main sections and/or others) which takes place subsequent to the riveting operation(s), i.e., following the completed assembly of an annular main section, an insert and a liner into a finished composite flange.

In accordance with a modification which is not specifically shown in the drawings, a fully assembled flange can comprise an annular sealing element (e.g., an elastic washer) between the conical surface of the annular main section and the adjacent side of the insert, and/or an annular sealing element between the inner side of the liner and the adjacent side of the insert. The sealing action of such elements is or can be attributable to the force with which the liner is urged axially toward the annular main section of the finished flange. The insert can be installed in prestressed condition (or undergoes an axial stress during assembly of the flange) so that it biases (pulls) the liner toward the annular main section to thus compress the aforediscussed sealing element or elements. A sealing element can be affixed to the liner or to the annular main section prior to assembly of the improved flange. Alternatively, one or two sealing elements can be affixed to the insert prior to placing of such insert between the annular main section and the liner.

Figure 9:
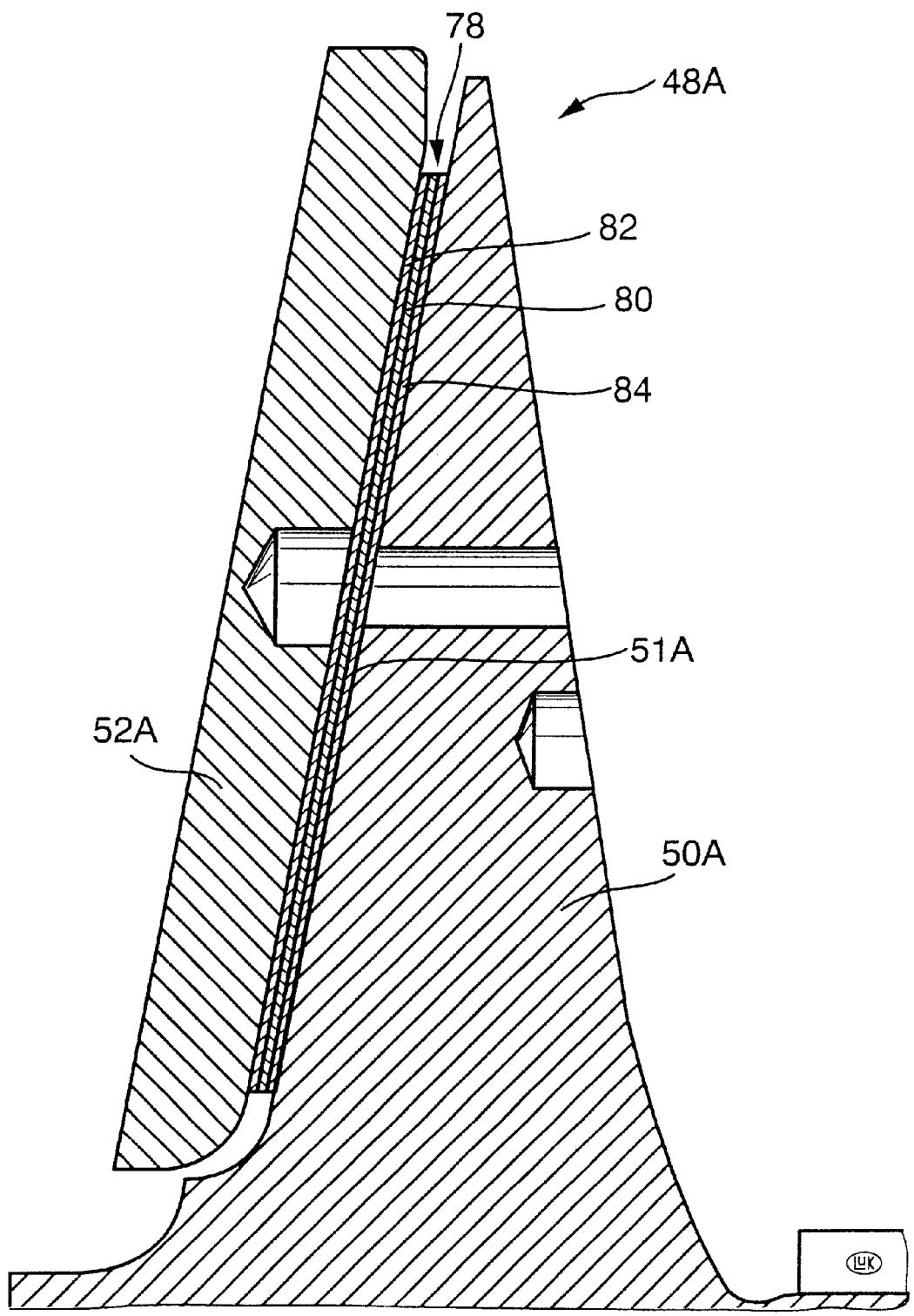
FIG. 9 is a fragmentary axial sectional view of an annular flange embodying an insert which constitutes a three-layer laminate.

FIG. 9 shows a flange 48A having an annular main section 50A, a liner 52A and an insert 78 which is a laminate having a central layer or stratum 80 sandwiched between and flanked by two outer layers or strata 82 and 84. The layers 82, 84 are made of a sound-absorbent material. The left-hand side of the outer layer 82 is bonded (e.g., glued) to the adjacent side of the liner 52A, and the right-hand side of the outer layer 84 is bonded (e.g., glued) to the adjacent conical surface 51A of the annular main section 50A.

Figure 10:
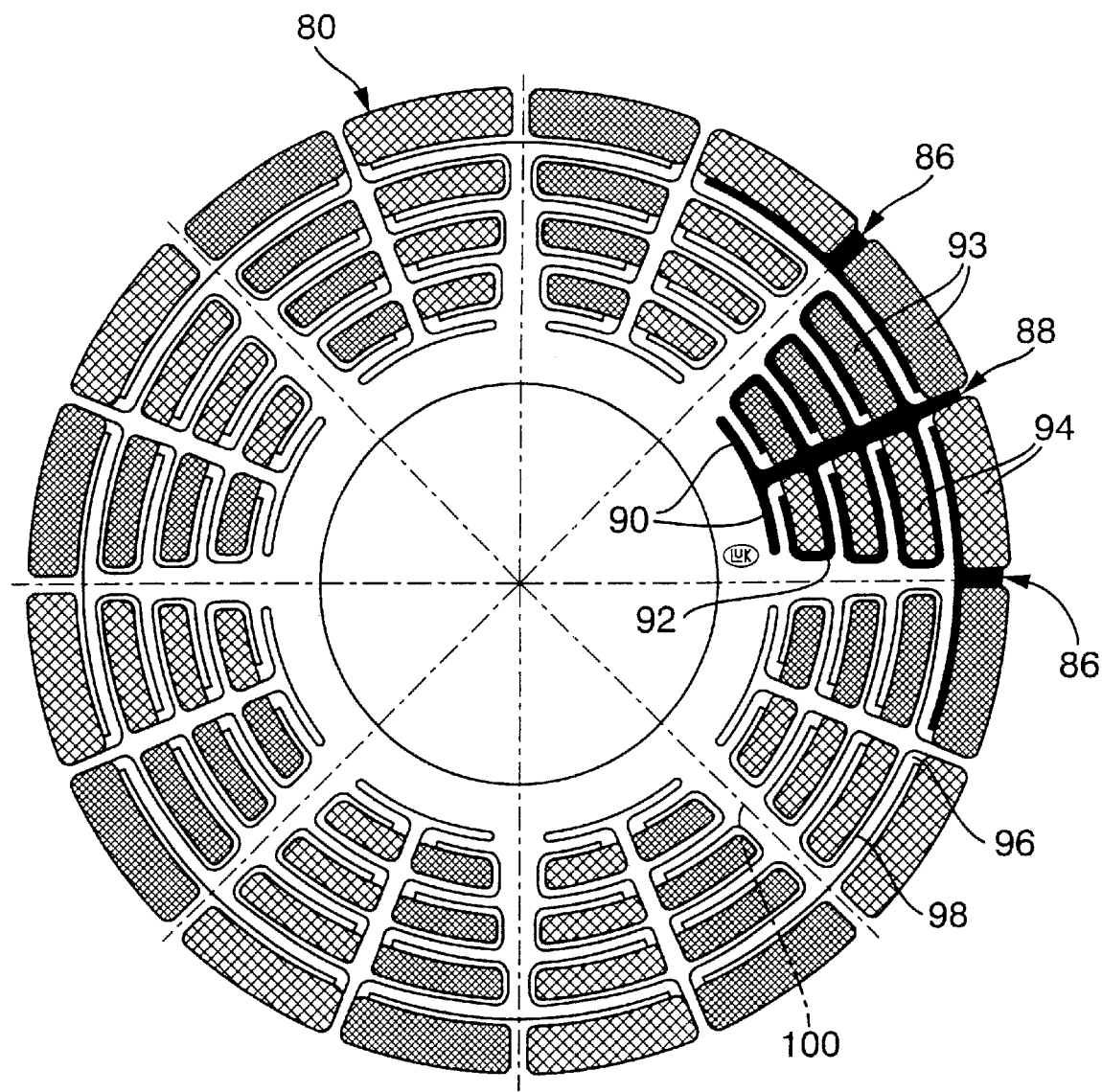
FIG. 10 is a front elevational view of the central layer in the three-layer laminate of FIG. 9.

The construction of the central layer 80 is shown in FIG. 10. The peripheral surface of this layer is provided with T-shaped slits 86 each having a radially extending portion and two circumferentially extending portions. The layer 80 is further provided with tree-shaped slits 88 which alternate with the T-shaped slits 86 (as seen in the circumferential direction of the layer 80) and each of which includes a relatively long radially extending portion or trunk 100 as well as circumferentially extending portions or branches 90, 92. The trunks 100 extend close to the central opening of the layer 80, and the relatively short branches 90 constitute the radially innermost branches of the respective tree-shaped slit 88. For convenience of observation, the outlines of two T-shaped slits 86 and of the tree-shaped slit 88 between them are shown in FIG. 10 by heavy lines. Each of the branches 92 includes a substantially U-shaped portion 98 merging, at 96, into the respective trunk 100.

The slits 86, 88 define two groups, sets or arrays of fields or panels 93, 94. The fields 93, 94 form radially extending rows, and the rows of fields 93 alternate with the rows of fields 94. The fields 93 are bonded to one of the outer layers 82, 84 and the fields 94 are bonded to the other of these outer layers.

The advantages of the just described central layer 80 and of the laminar insert 78 embodying such central layer are as follows:

The liner 52A has a highly satisfactory freedom of movement relative to the annular main section 50A in the axial direction of the flange 48A. The panels or fields (e.g., the fields 93) which are bonded to the annular main section 50A by way of the outer layer 84 are held against movement relative to the other panels or fields (94) which are bonded to the liner 52A by way of the outer layer 82. The extent of movement of the fields 94 relative to the fields 93 in the axial direction of the flange 48A is dependent upon the configurations and/or dimensions of the slits 86 and 88, i.e., the extent of movability of the liner 52A relative to the annular main section 50A can be selected in advance with a desired degree of accuracy by the expedient of selecting the dimensions of the slits 86, 88 and their mutual positions as seen in the circumferential direction of the flange 48A. At the same time, the central layer 80 cooperates with the outer layers 82, 84 to prevent any (or any appreciable) movements of the liner 52A relative to the annular main section 50A in the circumferential direction of the flange 48A.

The bonding of the fields 93, 94 to the respective outer layers 84, 82 and the bonding of the outer layers to the annular main section 50A and the liner 52A can be carried out in a number of different ways. For example, one can resort to a vulcanizing procedure if the parts to be bonded to each other are made of an elastomeric material.

It has been found that an insert (78) which constitutes a laminate and is bonded (rather than riveted) to the annular main section 50A and to the liner 52A is capable of absorbing pronounced noise which is generated as a result of contact between the liner 52A and the links (22) of an endless chain (20), i.e., such noise is not transmitted (or only a small fraction of such noise is transmitted) to the main section 50A of the flange 48A. Otherwise stated, the composite insert 78 is designed and mounted with a view to prevent the establishment of a metallic bridge between the constituents 50A, 52A of the flange 48A.

The modulus of elasticity of the insert 78 is much smaller than that of the liner 52A (which normally consists of steel) and/or of the annular main section 50A (which can constitute a casting); this, too, contributes to the aforedescribed desirable sound-absorbing characteristics of the flange 48A and of a transmission having pulleys which employ such flanges.

The configurations and dimensions of slits in the central layer 80, as well as the dimensions and the distribution of the fields defined by such slits, can be varied in a number of ways as long as the sound-absorbing characteristics of the insert 78 meet the requirements in the apparatus or device in which the insert is being put to use. The same holds true for the connecting means between the layers of the insert 78 and the connecting means between the outer layers 82, 84 and the liner 52A and annular main section 50A, respectively. It is important to select the units of the connecting means in such a way that the liner 52A has requisite freedom of radial and axial movement relative to the annular main section 50A but has much less freedom or no freedom of movement relative to the section 50A in the circumferential direction of the flange 48A.

In accordance with one presently preferred embodiment, the outer layers 82, 84 of the insert 78 are made of a material identical with that (or exhibiting the desirable characteristics) of friction linings of the nature utilized in various types of clutches and/or in many types of torque converters equipped with bypass clutches. The central layer can be made of sheet metal or paper, or it can constitute a matrix containing a resin reinforced by suitable filamentary material. It is also possible to employ a central layer which is a laminate comprising two or more layers or strata which are properly bonded to each other. Still further, it is possible to provide at least the central layer or at least one of the outer layers with one or more internal chambers and/or channels for one or more supplies of a solid (such as sand) or liquid (such as oil) filler material; this can enhance the sound absorbency of the respective layer or layers. The flowable solid or liquid material can at least partially fill the chamber (s) and/or channel(s) in the respective layer or layers.

FIGS. 11 to 13 illustrate certain details of a flange 48B employing an annular main section 50B, a liner 52B and an insert 78B constituting a modification of the laminar insert 78 of FIGS. 9–10. FIG. 12 shows that the central layer 102 of the insert 78B is or includes a woven or other suitable textile material which is sandwiched between the disc-shaped concentric layers 104, 106. Each of the layers 104, 106 comprises a set of concentric ring-shaped portions. Alternate ring-shaped portions of one set (layer 104) are connected with the layer 102 and with the annular main section 50B, and alternate ring-shaped portions of the other set (layer 106) are connected with the layer 102 and with the liner 52B. Thus, alternate ring-shaped portions of the other set (layer 106) are (directly or indirectly) bonded to the liner 52B, and alternate ring-shaped portions of the one set (layer 104) are bonded to the annular main portion or section 50B. Alternate ring-shaped portions of one (104) of the layers 104, 106 are identified in FIG. 12 by different hatchings. The central layer 102 can also consist of two sets of concentric ring-shaped portions which alternate in the radial direction of the flange and are affixed to the outer layers and/or to the parts 50B, 52B with a view to permit certain radial and/or axial movements of the liner 52B relative to the annular main section 50B but to prevent movements of the parts 50B, 52B relative to each other in the circumferential direction of the flange 48B.

An advantage of the flange 48B is that the movements of the main section 50B and the liner 52B relative to each other are determined and limited exclusively (or practically exclusively) by the material of the fibrous central layer 102. Such central layer can contain metallic and/or plastic filaments and is preferably elastic to such an extent that it can compensate for deformations between the rings of the layers 104, 106 to thus shield such layers from excessive shearing and/or tensional stresses.

It is also possible to replace layers which comprise several types or sets of concentric rings in a distribution as shown in FIG. 12 with arrays of substantially radially extending webs or strips which are alternatingly bonded to the annular main section 50B and to the annular liner 52B.

Figure 14:
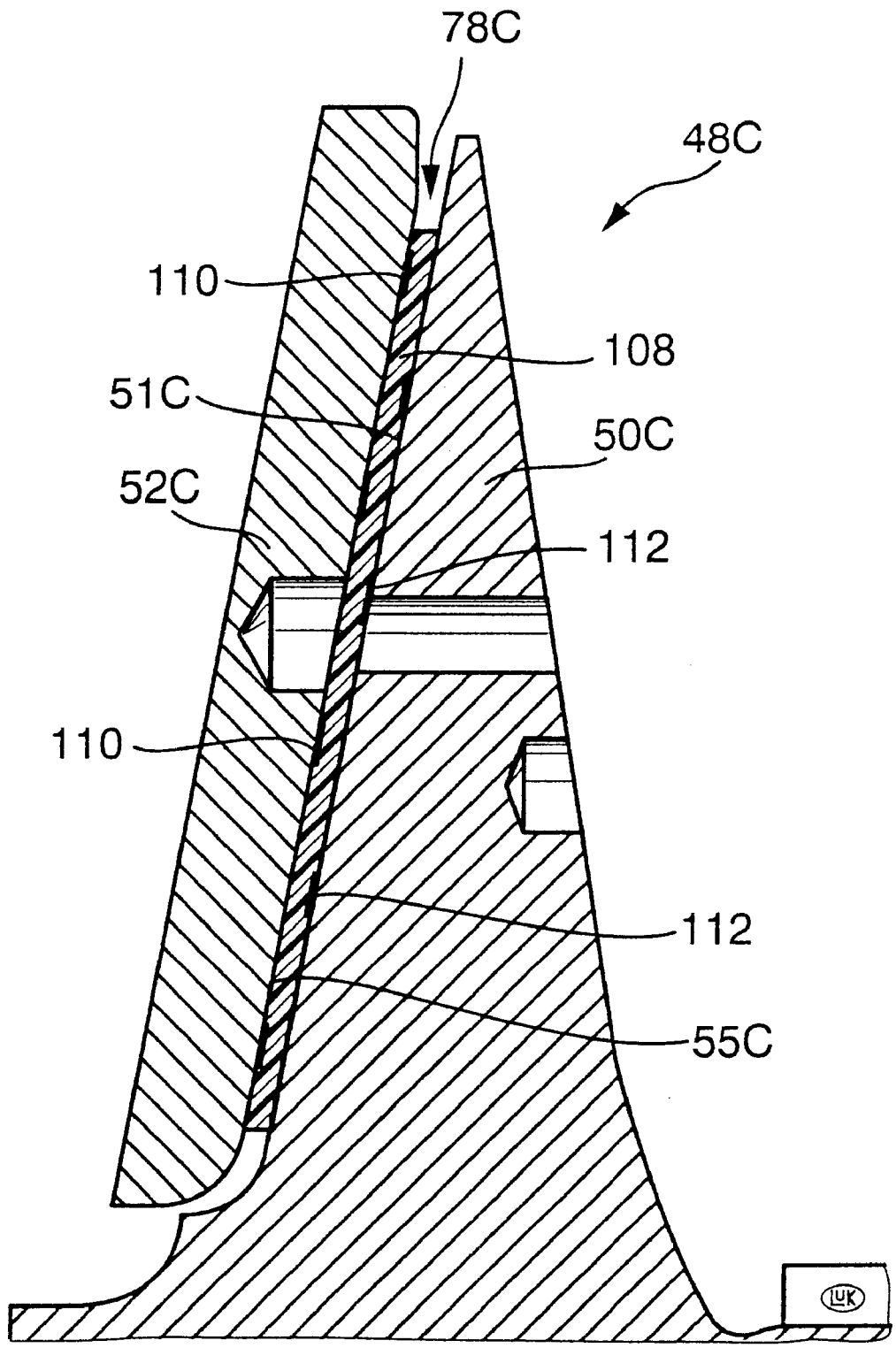
FIG. 14 is a fragmentary axial sectional view of a flange employing a different insert.

FIG. 14 illustrates a flange 48C including an annular main section 50C, a liner 52C and an insert 78C including a one-piece washer-like layer 108 which overlies at least the major part of the conical surface 51C of the section 50C. Portions 112 of that side of the layer 108 which faces the annular main section 50C are bonded to the surface 51C, and portions 110 of that side of the layer 108 which is adjacent the liner 52C are bonded to the side 55C of the liner. The portions 112 are not in register with the portions 110, at least as seen in the radial direction of the flange 48C.

The deformability of the layer 108 is such that its material is not subjected to excessive shearing stresses even though the main section 50C and the liner 52C can perform requisite movements relative to each other in the axial and radial directions but not circumferentially of the flange 48C. The portions 110, 112 can be offset relative to each other in the radial and/or circumferential direction of the layer 108. The one-piece layer 108 can be made of an elastomeric material exhibiting highly satisfactory sound-absorbing characteristics. Furthermore, such layer can be replaced with a laminate exhibiting the required elasticity and being able to prevent or reduce the transmission of sound.

Figure 15:
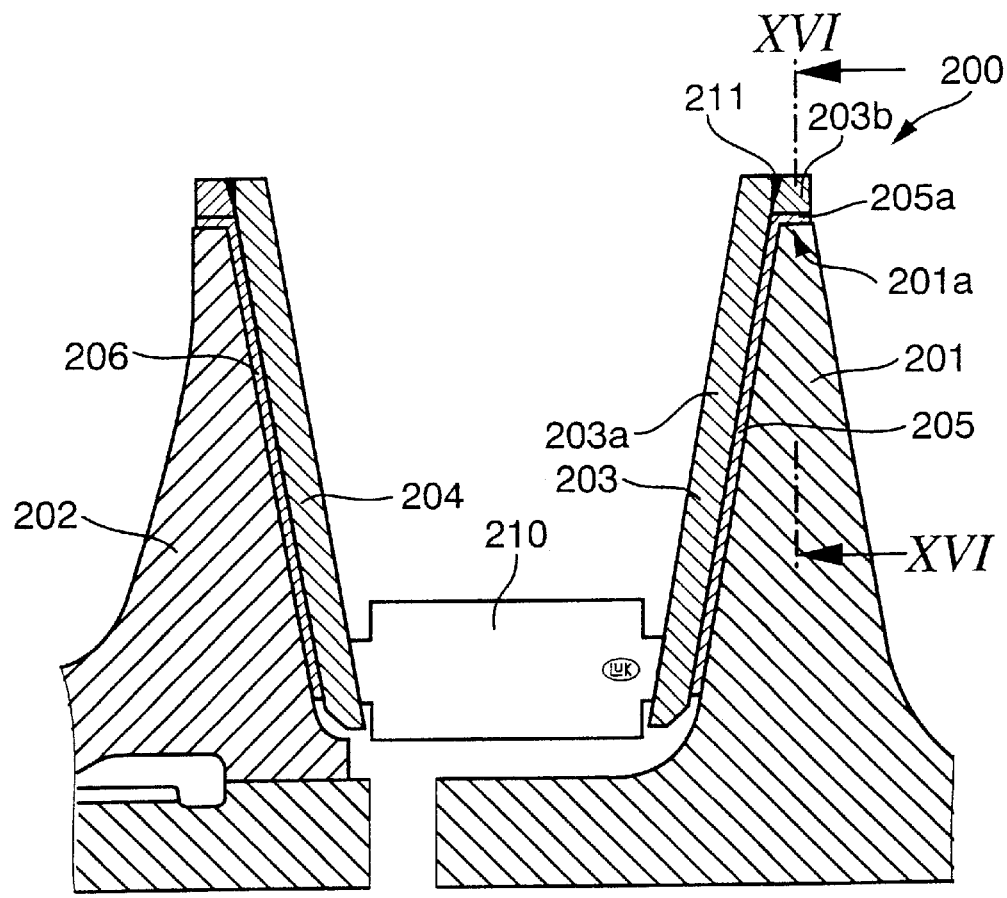
FIG. 15 is a fragmentary axial sectional view of a pulley having flanges which constitute further embodiments of the invention.

FIG. 15 shows a portion of an adjustable pulley or sheave 200 having an axially fixed conical flange 201 and a second flange 202 which is movable axially toward and away from but cannot turn relative to the flange 201. The confronting conical surfaces of the annular main portions of the flanges 201, 202 are respectively overlapped by liners 203, 204, and these flanges further comprise inserts 205, 206. An endless flexible element 210 is trained over the pulley 200 and over a second pulley, not shown in FIG. 15, and this endless flexible element is assumed to be a chain having links which frictionally engage the exposed sides of the liners 203, 204.

The liners 203, 204 are made of a metallic material, and each thereof can constitute a one-piece or a composite disc bounded by two conical surfaces. The liner 203 comprises a disc-shaped main portion 203a and an annular (short tubular) extension 203b which is welded, at 211, to the radially outermost part of the portion 203a and overlies the external peripheral surface of a similar annular (short tubular) extension 205a forming part of the insert 205. The extension 205a overlies the peripheral surface 201a of the main section of the flange 201. The extensions 203b and 205a center the liner 203 and the insert 205 relative to the annular main portion of the flange 201.

The flange 202 is or can be a mirror image of the flange 201.

Figure 16:
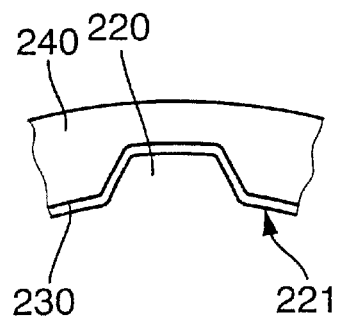
FIG. 16 is an enlarged fragmentary transverse sectional view as seen in the direction of arrows from the line XVI—XVI of FIG. 15.

In order to ensure that the main section of the flange 201, the liner 203 and the insert 205 of the flange 201 invariably rotate as a unit, the peripheral portion of the annular main section of this flange is provided with an annulus of teeth 220 which alternate with tooth spaces (recesses) 221 (see FIG. 16). The tooth spaces 221 receive internal teeth 230 of the annular extension 205a, and the teeth 230 overlie internal teeth 240 of the annular extension 203b. Such connection between the main section of the flange 201, the annular extension 205a of the insert 205 and the annular extension 203b of the liner 203 renders it possible to dispense with the provision of connecting means between the main section of the flange 201 and the major portion of the insert 205a, as well as to dispense with the provision of connecting means between the major portion of the insert 205 and the main or major portion 203a of the liner 203. The connections between the radially outermost portion 205a of the insert 205 and the adjacent portion (at 201a) of the main section of the flange 201 are radially offset relative to the connections between the portions 205a and 203b of the insert 205 and the liner 203.

Figure 17:
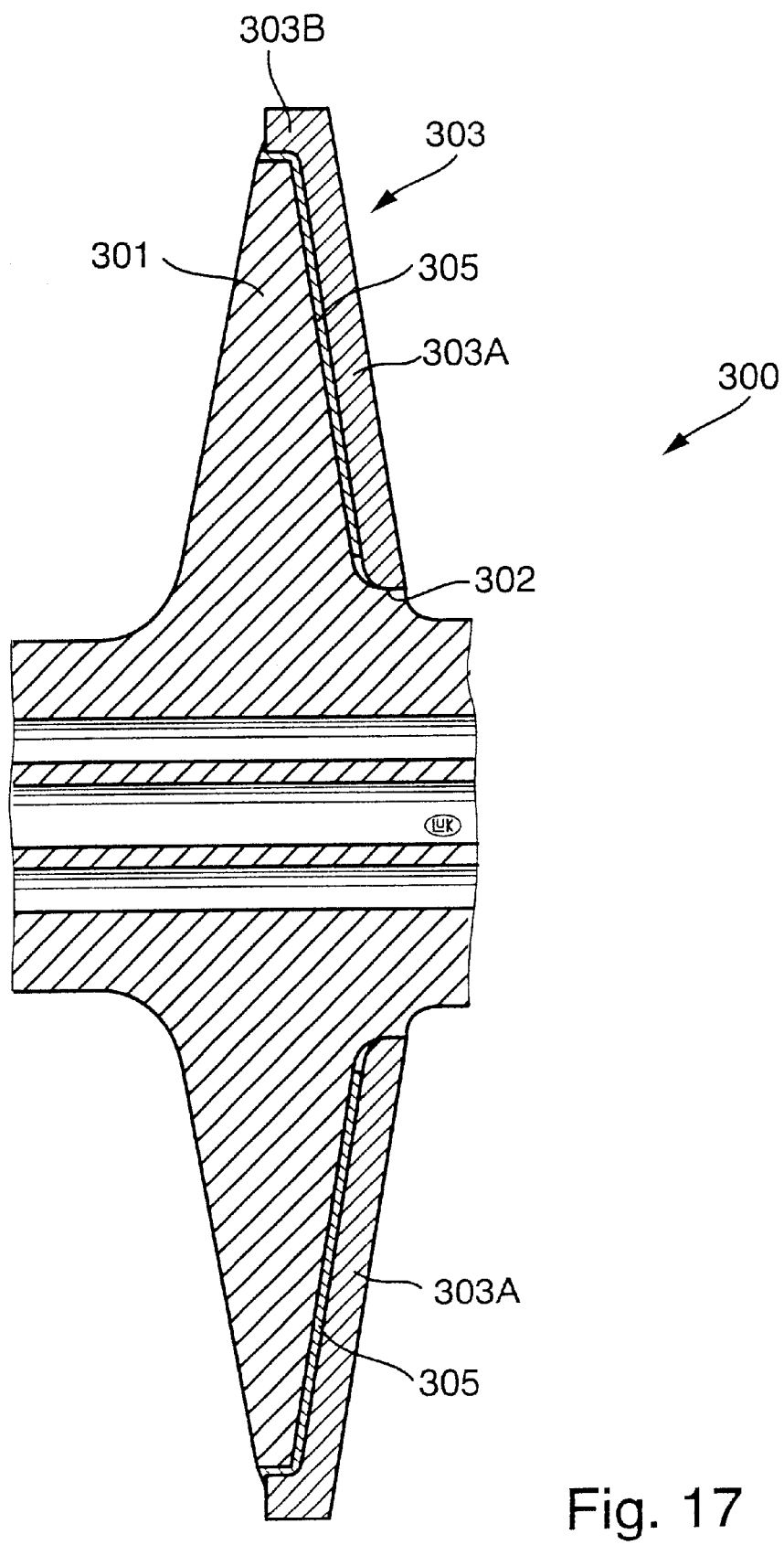
FIG. 17 is a fragmentary axial sectional view of a flange constituting a modification of the flanges shown in FIG. 15.

The flange 300 of FIG. 17 includes a main section 301, a liner 303 and an insert 305. The radially innermost portion of the liner 303 is centered on an external annular shoulder 302 of the main section 301. The manner in which the radially outermost portions of the parts 301, 303, 305 are connected to each other is or can be the same as described with reference to FIGS. 15 and 16. FIG. 17 shows that the annular extension 303b can be of one piece with the major portion 303a of the liner 303. The teeth of the radially outer portion of the main section 301, of the annular extension of the insert 305 and of the annular extension 303b are not shown in FIG. 17.

The flanges 201, 202 of the pulley 200 and/or the flange 300 can be produced and assembled as follows:

The description will refer to the making of the flange 201 shown in FIGS. 15 and 16. The annular main section of the flange 201 can be produced in such a way that its peripheral surface 201a is simultaneously provided with the teeth 220 and tooth spaces 221. FIG. 16 shows a tooth 220 having mutually inclined flanks and a flat top land; however, it is equally possible to resort to different types of teeth and tooth spaces. The insert 205 is made of sheet steel and it can assume the form shown in the right-hand portion of FIG. 15 as a result of deformation of a sheet steel blank against the main section of the flange 201. Such deforming step can also involve the making of the annular extension 205a and its teeth 230 which extend into the adjoining tooth spaces 221. The thickness of the insert 205 is or can be constant throughout, even upon completion of the deforming step.

Alternatively, the insert 205 can be caused to assume the shape shown in FIGS. 15 and 16 prior to assembly with the main section of the flange 201. If such procedure is being resorted to, it is often advisable to select the dimensions of the teeth 230 in the annular extension 205a in such a way that the teeth 230 are not exactly complementary to the teeth 220, i.e., that a certain force is necessary in order to move the teeth 230 of the prefabricated insert 205 into mesh with the teeth 220 of the main section of the flange 201. The manner of assembling the insert 205 with the main section of the flange 201 is preferably such that the insert lies flush against the adjacent portions of the main section.

The liner 203 can also consist of a metallic sheet material and can be shaped prior to being slipped or forced onto the insert 205. The shape of the prefabricated liner 203 conforms, at least substantially, to the shape of the prefabricated insert 205, or the shape of an insert which is caused to assume the configuration shown in FIGS. 15 and 16 solely as a result of deformation against the main section of the flange 201.

As already described hereinbefore, the liner 203 can be assembled of two portions 203a, 203b which are welded (at 211) or otherwise secured to each other. However, and as shown in FIG. 17, it is equally possible to employ a one-piece liner. If the liner is made of two parts, the annular extension 203b can be welded to the main portion 203a while the latter is maintained in a position of abutment with the major portion of the insert 205.

The teeth shown in FIG. 16 are or can be configurated and dimensioned in such a way that the internal teeth 240 of the extension 203b are a snug fit in the tooth spaces between the teeth 230 of the extension 205a. The play between the flanks of interfitted teeth 230, 240 is or can be less than the thickness of the sheet material of the insert 205. The purpose of such dimensioning of the teeth 230, 240 is to ensure that the extension 205a undergoes requisite deformation when the extension 203b is caused to assume the final position which is shown in FIG. 15. The deformation should be carried out at least along the flanks of the teeth 230. The deformation of the extension 205a is permanent, i.e., it exceeds the elastic limit of the material of the insert 205. This ensures that the extension 205a is held without play between the extension 203b and the peripheral surface 201a of the main section of the flange 201. In addition, the insert 205 is properly centered relative to the main section as well as relative to the liner 203.

An advantage of the just described method is that, if the engagement of the insert 205 with the liner 203 and with the main section of the flange 201 is established only at the surface 201a and the extensions 203b, 205a, this entails a reduction of reaction forces which develop in the radial direction during assembly of the flange 201. In addition, the mating teeth 220, 230, 240 ensure the transmission of torque between the flange 201 and the chain 210 without any or with a permissible play.

The extent of mesh between the teeth 220, 230, 240 can be selected in such a way that the teeth are interfitted only at their flanks, only at the roots or only at the top lands, preferably in such a way that they lie flush against each other at the flanks as well as at the roots and/or at the top lands.

The sequence of the aforedescribed steps can be altered without departing from the spirit and scope of the invention. For example, the insert 205 and the liner 203 can be assembled into a prefabricated unit which is thereupon mounted on the main section of the flange 201.

Figure 18:
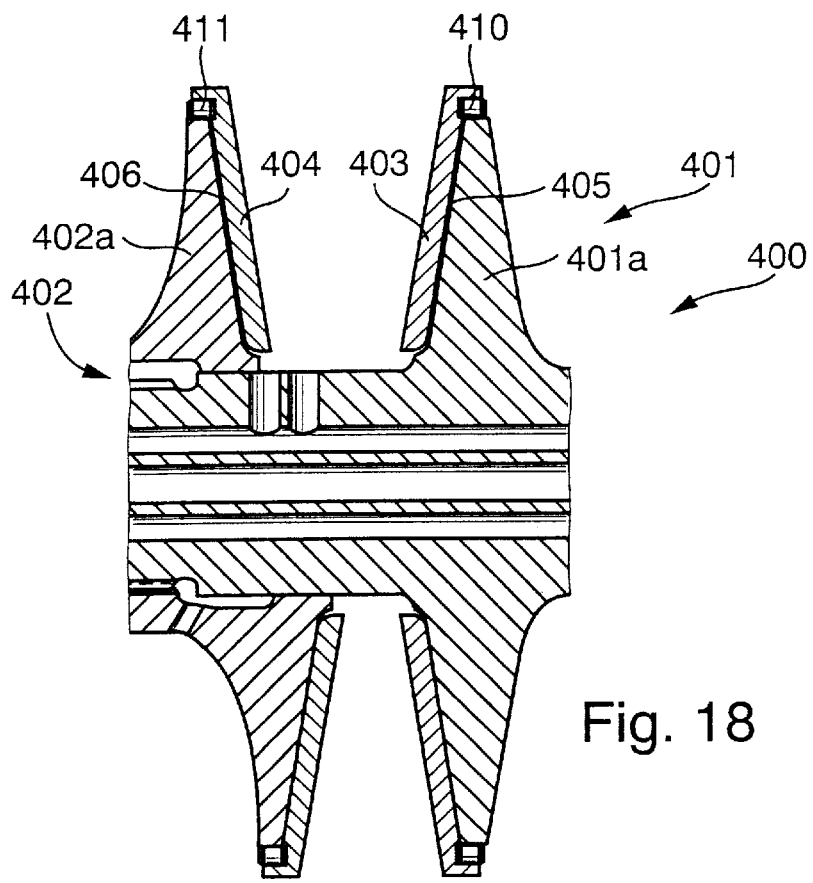
FIG. 18 is a fragmentary axial sectional view of a pulley with flanges constituting further modifications of the flanges shown in FIG. 15.
Figure 19:
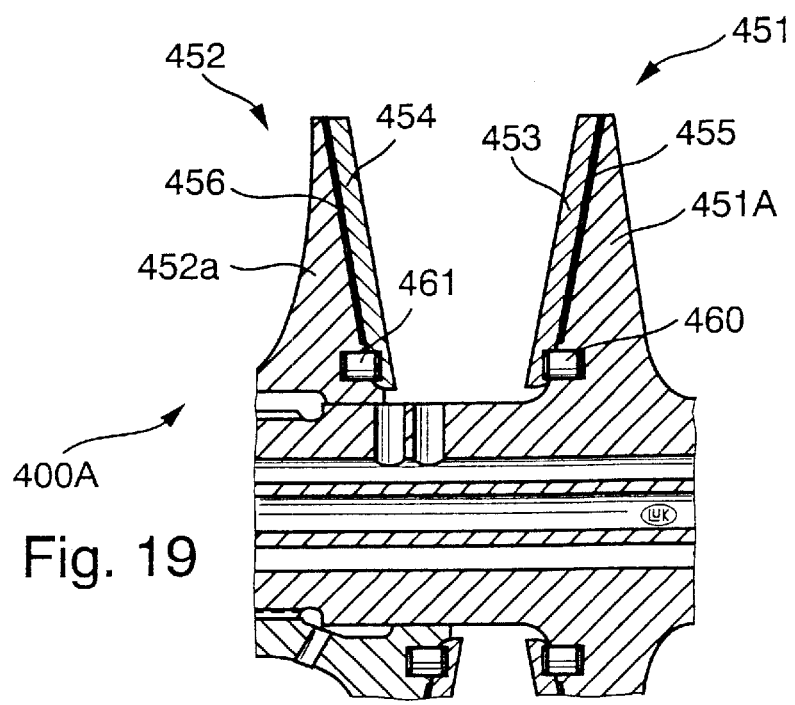
FIG. 19 is a fragmentary axial sectional view of a pulley constituting a modification of the pulley shown in FIG. 18.

FIGS. 18 and 19 respectively illustrate pulleys 400 and 400A wherein the manner of mounting the liners on the main sections of the flanges departs from those described hereinbefore. The pulley 400 comprises flanges 401, 402 respectively having main sections 401a, 402a, liners 403, 404 and inserts 405, 406. That unit of the connecting means which couples the section 401a with the liner 403 comprises pins 410, and the insert 405 can be bonded to the main section 401a and to the liner 403, e.g., in a manner as described with reference to FIG. 3, 8 or 9. However, the pins 410 can also serve to secure the insert 405 to the main section 401a and/or to the liner 403. Such pins can be replaced with bolts, screws, rivets and/or other mechanical affixing means. Threaded fasteners can be introduced into tapped bores or holes of two or all three parts 401a, 403, 405.

The axially movable flange 402 is a mirror image of the axially fixed flange 401. The pins 411 or analogous fasteners perform functions corresponding to those of the pins 410. Such pins are located at the radially outermost portions of the respective flanges.

The pulley 400A of FIG. 19 comprises an axially fixed flange 451 having a main section 451a, a liner 453 and an insert 455. The axially movable flange 452 of the pulley 400A comprises a main section 452a, a liner 454 and an insert 456. The pins 460 connect the radially inner or innermost portion of the liner 453 to the part 455 and/or 451a of the flange 451, and the pins 461 connect the radially innermost portion of the liner 454 to the insert 456 and/or to the main section 452a of the flange 452. Furthermore, the radially outermost portions of the liners 453, 454 are devoid of tubular or analogous extensions of the type forming part of the liners 403, 404 shown in FIG. 18.

FIGS. 20 and 21 show a different mode of centering a liner 503 on a shoulder 511 forming part of the main section 501a of the flange 501. The shoulder 511 has a non-circular outline and is snugly surrounded by a complementary internal surface 510 of the liner 503. The insert 505 can be bonded to the adjacent conical surface of the main section 501a and to the adjacent side of the liner 503. The manner in which the liner 503 is affixed to the main section 501a (to thus hold the insert 505 in requisite position) is not shown in FIGS. 20 and 21; for example, one can resort to connecting means of the type shown in FIG. 19. The centering action at 510, 511 is such that the centers of the parts 501a, 503 are located on the axis of the pulley including the flange 501. The internal surface 510 need not be in contact with the entire shoulder 511, as long as the surface 510 and the shoulder 511 cooperate to hold the liner 503 and the main section 501a against angular movement relative to each other.

FIGS. 22 and 23 illustrate a portion of a flange 550 having a main section 551, a liner 553 and an insert 555. The liner 553 includes an internal gear 560 having teeth which mate with the teeth of an external gear 561 forming part of the main section 551 or the shaft 552. The mating teeth of the gears 560, 561 hold the liner 553 and the main section 551 against rotation relative to each other. In addition, such gears center the liner on the main section.

The gear 560 or 561 need not be a complete circular gear. For example, the liner 553 can be provided with a relatively small number of internal teeth which mesh with the adjacent teeth of the gear 561. Furthermore, the illustrated gears 560, 561 can be replaced with oval gears.

It is often advisable to employ a metallic insert (such as 555) at least one side of which is phosphatized, provided with a film of chromium plating or otherwise treated to increase the resistance to wear. The same applies for the conical surface of the main section 551 of the flange 550 and/or for one or both sides of the liner 553.

On the other hand, it is often desirable to provide one side of the liner and/or the sides of the insert and/or the conical surface of the main section of a flange with a film of Teflon (trademark) or another material which enhances the smoothness, slidability or analogous characteristics of the coated part or parts. Such coating is desirable if the friction between the sides of the insert and the adjacent parts should be kept to a minimum or below a preselected threshold value.

It is often advisable to lubricate the sides of the insert, e.g., by establishing at least one intermittent or continuous flow of oil or another suitable lubricant along one or both sides of the insert. Such lubrication is desirable on the ground that it reduces the likelihood of the development of so-called frictional or fretting corrosion; in addition, the lubricant reduces the likelihood of pronounced and premature wear upon the surfaces which are maintained in frictional contact with each other. The lubricant can be caused to flow from a source into and through channels and/or grooves in the surfaces or sides to be lubricated and/or in those surfaces or sides which are adjacent the sides or surfaces to be lubricated.

Satisfactory results were obtained with pulleys wherein the inserts between the liners and the main sections of the flanges are made of sheet steel or a friction bearing material (such as bronze).

The main sections of the flanges can constitute castings to thus reduce the cost of the pulley. However, it is often desirable to employ high-quality main sections, for example, main sections made of case hardened, tempered or induction hardened. metallic material.

The liners of the flanges forming part of the improved pulleys can be case hardened.

An important advantage of the inserts and of the aforedescribed mounting of such inserts in the flanges of pulleys or sheaves, particularly for use in continuously variable transmissions in the power trains of motor vehicles, is that the inserts are subjected to negligible shearing stresses or to shearing stresses which are less pronounced than those in heretofore known flanges forming part of pulleys. Furthermore, if the inserts are bonded to the adjacent parts of a flange, the bonds are also subjected to negligible or relatively small shearing stresses. This is attributable, at least in part, to the aforedescribed desirable characteristics (such as stretchability and/or flexibility) of the inserts, i.e., such inserts and/or their connections with the adjacent component parts of a flange can compensate for or greatly reduce the shearing and/or analogous stresses which develop in actual use of a pulley.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution of the art of pulleys and, therefore, such adaptations should and are intended to be comprehended within the meaning and range of equivalence of the appended claims.

What is claimed is:

1. A pulley comprising a rotary flange including:

an annular section rotatable about a predetermined axis and having an annular surface extending at least substantially radially of said axis;

an external tooth profile on an outer circumference of the rotary flange;

a wear resistant liner adjacent said surface, the liner being a rigid, non-elastic member; and an insert between said liner and said surface, the insert being a member having a significantly smaller thickness than the liner and the annular section, wherein the liner has at an outer radius an axial annular protrusion that is fixedly connected to a main portion of the liner, wherein the annular protrusion has an internal tooth profile, and wherein further the annular protrusion surrounds said outer circumference so that said internal tooth profile engages said external tooth profile.

2. The pulley of claim 1, wherein the axial annular protrusion is fixedly connected to the main portion by a weld.

3. A method of making a pulley of the type having flanges at least one of which includes (a) an annular section rotatable about a predetermined axis and having an annular surface, (b) an outer circumference with an external tooth profile, and (c) a liner adjacent the annular surface and engageable by an endless flexible element for transmission of torque to and from the pulley, the liner being a rigid, non-elastic member comprising the steps of:

placing an annular disc-shaped insert between the surface of the annular section and the liner, the insert being a member having a significantly smaller thickness than the liner and the annular section; and fixedly connecting an axial annular protrusion to a main portion of the liner, said annular protrusion having an internal tooth profile, and seating the liner on the flange so that the annular protrusion surrounds said outer circumference and said internal tooth profile engages said external tooth profile.

4. The method of claim 3, wherein fixedly connecting the axial annular protrusion comprises the step of welding the axial annular protrusion to the main portion of the liner.

* * * * *